INVENTOR.
EMIL DE SIMONE
BY J. Bradley Cohn
ATTORNEY.

United States Patent Office 3,181,264
Patented May 4, 1965

3,181,264
FISHING ROD HANDLE
Emil De Simone, Hillsdale, N.J., assignor to The Conolon Corporation, a corporation of California
Filed Nov. 8, 1962, Ser. No. 236,257
5 Claims. (Cl. 43—22)

This invention relates to an improved fishing rod handle and particularly to the means for attaching the reel to the handle.

It is an object of the invention to provide a simplified structure for releasably securing a reel to the handle.

It is a further object that such structure be independent of the means for securing the rod to the handle and that its operating mechanism be located away from the hand of the user to prevent unintentional release.

Particularly, it is an object of the invention to provide an actuating structure containing a minimum number of parts with the actuating mechanism located at the butt of the handle.

Still another object of the invention is to provide such a mechanism which may be compactly located within the handle without weakening the strength thereof.

Heretofore such mechanisms have involved either positioning the actuating mechanism closely adjacent the reel where it may be inadvertently engaged by the fingers of the user or forwardly of the reel where it must either be coupled to or at least crowd upon the rod fastening mechanism.

Another object of the invention is to provide such a reel with a structure suitable for economic fabrication of parts and ease of assembly.

Figure 1:
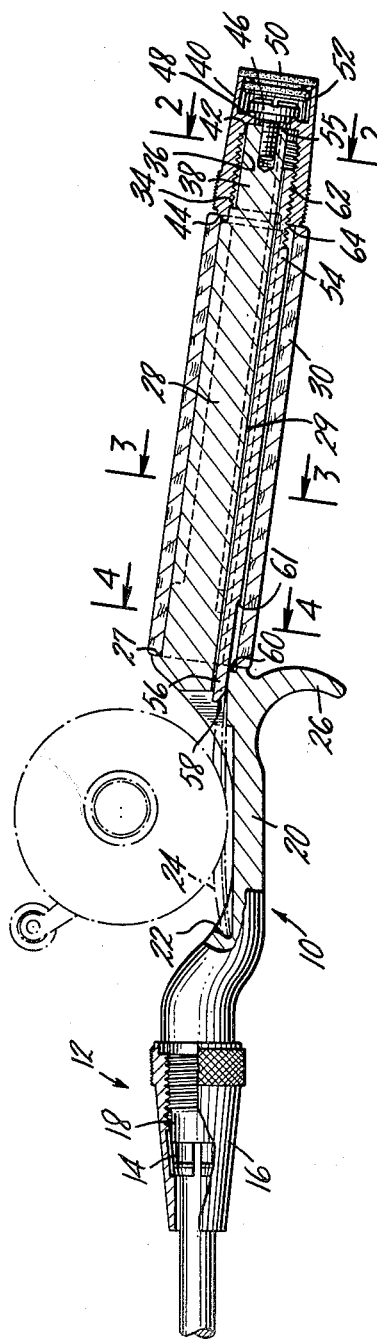

Referring to the drawings, FIG. 1 shows a side elevation, partly in section, of the rod handle in accordance with the invention.

Figure 4:
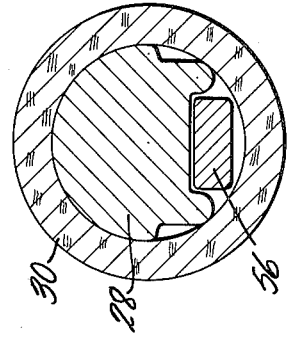
Figure 3:
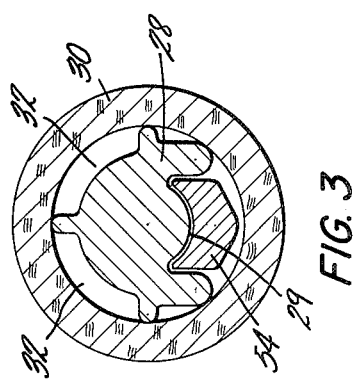
Figure 2:
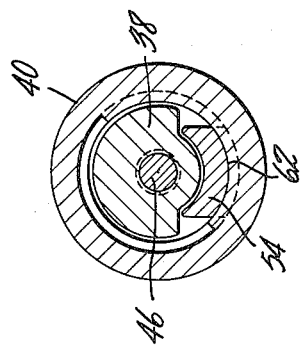

FIGS. 2, 3 and 4 are cross sectional views taken on the lines 2—2, 3—3, and 4—4 respectively.

Referring to the drawings, the rod handle 10 has a rod chuck 12 at its forward end. The chuck 12 comprises the conical split jaws 14 tightened by the conical lock member 16 threaded on the stem 18 of the base 20 of the handle. The base 20 is shaped to form a grooved base for the reel and presents the forward lip 22 to receive the forward portion of the base plate 24 (shown in phantom) of a reel. Base 20 is further shaped to form a trigger rest 26. Extending rearwardly, preferably at an angle to the axis of the chuck 12 is a reduced shaped handle body 28. Preferably, the parts 18, 20, 26 and 28 are integrally formed of a material having stout structural strength such as metal.

The shaped handle body 28 is primarily semi-circular in cross section with a shaped guide surface or groove 29 on its lower longitudinal side. Press fit about the handle body 28 and forwardly arrested by the shoulder 27 is the handle grip 30 formed of rubber, cork or similar material. Improved tactile resiliency in the handle grip 30 is afforded by longitudinal grooves 32 formed over the major rearwardly extending portion of the handle body 28.

A rearward extension 38 of the handle body 28 is reduced to provide a thrust shoulder 34 and is shaped to form an annular bearing surface 36. A knurled cap 40 is formed with an annular bearing surface 42 rotatably engaging the surface 36. Cap 40 is internally threaded and further has a face 44 which engages and arrests rearward movement of the handle grip 30. The end of stud 38 is tapped to receive a screw 46 extending through the opening 48 of cap 40. An annular extension 52 of cap 40 contains a grommet 50 esthetically concealing screw 46.

A small washer 55 serves as a thrust bearing between the cap 40 and the screw head 46. Longitudinally slidable on the surface 29 of the handle body 28 is the locking rack 54. The forward end of the locking rack 54 has a bar 56 having an inclined face 58 which, on forward axial movement of the rack 54, locks the rearward extension of the base 24 of the reel. In the absence of a reel base, a shoulder 60 limits the forward movement of the rack 54 by engaging shoulder 61 of said rack.

The rearward end of rack 54 is reduced and threaded to engage the complementary threads on the internal bore of actuating cap 40. The rearward motion of the rack 54 is limited by abutting against the annular lip 64 of cap 40.

It may thus be seen that rotation of the cap 40 axially moves the rack 54 its length of travel from a position of release of the base 24 of the reel to a position locking the base 24 to the handle. The entire structure of cap 40, rack 54, and grip 30 may be disassembled simply by removing the grommet 50 and the screw 46 with its washer 55. This releases cap 40 permitting the rack 54 and grip 30 to slide rearwardly from handle body 28.

I claim:

1. A rod handle having a rearwardly extending handle body, a longitudinal groove in the exterior surface of the body, a locking rack slidable in said groove, a handle grip mounted about said rack and said handle body, said handle body extending substantially the full length of said grip, and a member rotatably mounted on the rearward portion of said body and having a thread engaging said rack, means holding said member against axial movement so that rotation of said member axially moves the rack whereby a reel base may be releasably locked to said handle.

2. A fishing rod handle having a rearwardly extending handle body having a longitudinal groove formed in the exterior surface thereof, a reel base seat formed in said handle, said seat having a forward overhanging lip and a rearwardly extending opening, said opening and said longitudinal groove communicating and being in axial alignment, a locking rack slidably mounted in said groove and extending through said opening to form an adjustable rearward locking lip, a cap having an annular smooth bearing surface and being rotatably mounted on the butt end of said handle body, said bearing surface and said mounting being constructed and arranged to prevent axial movement of said cap, said cap being internally threaded, complementary thread means formed on a rearwardly extending portion of said rack whereby rotation of said cap axially moves said rack into an out of locking position at said reel seat.

3. A device substantially as set forth in claim 2 and further characterized by a tubular hand grip mounted about said rearwardly extending handle body and said rack, said annular cap having a shoulder to retain said tubular grip against axial sliding movement.

4. A rod handle having a rearwardly extending handle body having a longitudinal groove formed therealong, a reel base seat formed in said handle forwardly of said handle body, said handle body having its longitudinal axis angled from the longitudinal axis of said reel base seat, said reel base seat having a forward overhanging lip and a rearwardly extending opening, said opening and said longitudinal groove communicating and being in axial alignment, a lock rack slidable in said groove parallel to the axis of said handle body and extending through said opening to form an adjustable lip, a handle grip about said rack and said handle body, said handle body extending substantially the full length of said grip, a threaded cap, means mounting said threaded cap on the butt end of said handle body, said means being constructed and arranged to permit rotation of said cap and to prevent axial movement thereof, said threaded cap being in threaded engagement with said rack whereby said rotation moves said rack longitudinally into and out of locking position at said reel seat.

5. A fishing rod handle comprising a unitary member having formed therein a reel base seat, a forward end of said reel base seat presenting a stationary overhanging lip, a rearwardly extending shaft fixed to said member, a longitudinal groove formed along the bottom of said shaft, there being an opening formed in said unitary member extending forwardly coaxially from said groove to said formed base seat, a locking rack positioned in said groove and extending through said opening to form an adjustable rearward locking lip in said base seat, means movably mounted on the rearward end of said shaft to engage said rack for axial movement into and out of reel locking position at said base seat, and a tubular hand grip mounted about said rack and said rearwardly extending shaft and forwardly of said means.

References Cited by the Examiner
UNITED STATES PATENTS

| | | | |
|---|---|---|---|
| 1,711,248 | 4/29 | Powell | 43—22 |
| 2,057,535 | 10/36 | McKechnie | 43—22 |
| 2,114,107 | 4/38 | Holding | 43—22 |
| 2,593,747 | 4/52 | Godfrey | 43—22 |

FOREIGN PATENTS 461,185  11/49  Canada.

SAMUEL KOREN, *Primary Examiner.*